(12) United States Patent
Zhang et al.

(10) Patent No.: US 10,264,777 B2
(45) Date of Patent: Apr. 23, 2019

(54) ANT BAIT STATIONS WITH ATTRACTANT VECTOR COMPARTMENT AND EASY OPENING

(71) Applicant: Sterling International Inc., Spokane, WA (US)

(72) Inventors: Qing-He Zhang, Greenacres, WA (US); Rodney G. Schneidmiller, Greenacres, WA (US)

(73) Assignee: Sterling International Inc., Spokane, WA (US)

( * ) Notice: Subject to any disclaimer, the term of this patent is extended or adjusted under 35 U.S.C. 154(b) by 271 days.

(21) Appl. No.: 15/443,896

(22) Filed: Feb. 27, 2017

(65) Prior Publication Data

US 2017/0245488 A1 Aug. 31, 2017

Related U.S. Application Data

(60) Provisional application No. 62/300,752, filed on Feb. 26, 2016.

(51) Int. Cl.
*A01M 1/20* (2006.01)
*A01M 1/02* (2006.01)
(Continued)

(52) U.S. Cl.
CPC ............ *A01M 1/2011* (2013.01); *A01M 1/02* (2013.01); *A23K 20/10* (2016.05); *A23K 20/147* (2016.05); *A23K 20/163* (2016.05); *A23K 50/90* (2016.05)

(58) Field of Classification Search
CPC .............................. A01M 1/2011; A01M 1/02
See application file for complete search history.

(56) References Cited

U.S. PATENT DOCUMENTS 4,065,872 A * 1/1978 Patton .................. A01M 1/2011
 43/131
4,709,504 A * 12/1987 Andric .................... A01M 1/14
 43/114
(Continued)

FOREIGN PATENT DOCUMENTS

DE 20 2004 013 880 U1 4/2005
DE 10 2007 055 592 A1 5/2009
(Continued)

OTHER PUBLICATIONS

Australian Patent Examination Report No. 2, dated Feb. 14, 2014, issued in corresponding Australian Application No. 2011289502, filed Aug. 9, 2011, 7 pages.
(Continued)

*Primary Examiner* — Christopher P Ellis
(74) *Attorney, Agent, or Firm* — Christensen O'Connor Johnson Kindness, PLLC; Ryan E. Dodge, Jr.

(57) ABSTRACT

An ant bait station is formed as a stick pack having multiple compartments, wherein each of the compartments contain a bait for a target ant species, and includes a plurality of apertures to the respective compartments. Some or all of the baits may contain a pesticide, for example a borate. In at least one of the compartments containing a pesticide, the apertures are large enough to permit the target ants to enter and exit. In some embodiment a compartment contains a bait without a pesticide. This may improve performance if the non-pesticidal bait attracts ants to the trap, and the lack of pesticidal component extends the life of the attractant. The compartment containing the bait without a pesticide may have apertures that are too small to permit the ants from entering and exiting.

15 Claims, 10 Drawing Sheets

(51) Int. Cl.
*A23K 50/90* (2016.01)
*A23K 20/163* (2016.01)
*A23K 20/147* (2016.01)
*A23K 20/10* (2016.01)

(56) References Cited

U.S. PATENT DOCUMENTS

| | | | |
|---|---|---|---|
| 4,837,969 A * | 6/1989 | Demarest | A01M 1/2005 43/124 |
| 5,150,722 A | 9/1992 | Rutherford | |
| 5,152,096 A * | 10/1992 | Rudolph | A01M 1/026 43/124 |
| 5,573,770 A | 11/1996 | Kern | |
| 5,782,409 A | 7/1998 | Paul | |
| 6,109,537 A | 8/2000 | Heath | |
| 6,195,933 B1 * | 3/2001 | Woodruff | A01M 1/2011 43/131 |
| 6,272,791 B1 * | 8/2001 | Pleasants | A01M 1/2011 43/131 |
| 6,532,696 B2 * | 3/2003 | Clark, III | A01M 1/2005 43/107 |
| 6,548,085 B1 | 4/2003 | Zobitne | |
| 6,618,983 B1 * | 9/2003 | Spragins | A01M 1/14 43/107 |
| 7,393,528 B2 | 7/2008 | Tvedten | |
| 7,575,765 B1 | 8/2009 | Hughes | |
| 2002/0069579 A1 * | 6/2002 | Hyatt | A01M 1/2011 43/131 |
| 2005/0000147 A1 * | 1/2005 | Westphal | A01M 1/2005 43/131 |
| 2005/0091911 A1 * | 5/2005 | Matts | A01M 1/026 43/131 |
| 2005/0252074 A1 * | 11/2005 | Duston | A01M 1/2005 43/131 |
| 2006/0016905 A1 | 1/2006 | Roreger | |
| 2006/0029630 A1 | 2/2006 | Overman | |
| 2006/0165746 A1 | 7/2006 | Markus | |
| 2007/0098750 A1 | 5/2007 | Bessette | |
| 2007/0166342 A1 | 7/2007 | Darling | |
| 2007/0178128 A1 | 8/2007 | Bessette | |
| 2007/0190094 A1 | 8/2007 | Bessette | |
| 2008/0095813 A1 | 4/2008 | Kiec | |
| 2008/0107640 A1 | 5/2008 | Tvedten | |
| 2008/0166415 A1 | 7/2008 | Markus | |
| 2008/0187607 A1 | 8/2008 | Bessette | |
| 2008/0269177 A1 | 10/2008 | Bessette | |
| 2008/0274072 A1 | 11/2008 | Manolas et al. | |
| 2009/0099135 A1 | 4/2009 | Enan | |
| 2009/0232918 A1 | 9/2009 | Enan | |
| 2010/0144888 A1 | 6/2010 | Bessette | |
| 2010/0205850 A1 * | 8/2010 | Bernard | A01M 1/2011 43/131 |
| 2010/0319239 A1 * | 12/2010 | Kirkland | A01M 1/2011 43/131 |
| 2014/0082994 A1 * | 3/2014 | Mayo, Jr. | A01M 1/2011 43/131 |
| 2017/0118971 A1 * | 5/2017 | Hwang | A01M 1/103 |
| 2017/0196214 A1 * | 7/2017 | Lubic | B65D 1/0238 |

FOREIGN PATENT DOCUMENTS

| | | | | |
|---|---|---|---|---|
| EP | 2781155 A2 * | 9/2014 | | A01M 1/103 |
| IL | 123878 A | 3/2001 | | |
| WO | 1999/052359 A1 | 10/1999 | | |
| WO | WO-0072671 A1 * | 12/2000 | | A01K 67/033 |
| WO | 2001/091554 A1 | 12/2001 | | |
| WO | 2006/072039 A1 | 7/2006 | | |
| WO | 2007/051814 A1 | 5/2007 | | |
| WO | 2009/038599 A1 | 3/2009 | | |
| WO | 2009/123907 A1 | 10/2009 | | |

OTHER PUBLICATIONS

Extended European Search Report dated Aug. 11, 2014, issued in corresponding European Application No. 11816931.7, filed Aug. 9, 2011, 6 pages.

"Herbal Insect Repellent," Burt's Bees, Dec. 23, 2009, <http://web.archive.org/web/20091223025921/http://global.burtsbees.com/natural-products/sun-and-outdoor-protection/herbal-insect-repellent.html> [retrieved Jan. 29, 2014], 2 pages.

International Search Report and Written Opinion dated Mar. 23, 2012, issued in corresponding International Application No. PCT/US2011/047105, filed Aug. 9, 2011, 7 pages.

International Search Report and Written Opinion dated Apr. 24, 2012, issued in related International Application No. PCT/US2011/054338, filed Sep. 30, 2011, 6 pages.

"Mortein Odourless Mozzie Zapper," Reckitt Benckiser, Inc., Sep. 30, 2009, <https://web.archive.org/web/20090930041517/http://www.mortein.com.au/product_odour_mozzie_zap.php> [retrieved Nov. 19, 2013], 3 pages.

Patent Examination Report dated Nov. 25, 2013, issued in corresponding Australian Patent Application No. 2011289502, filed Aug. 9, 2011, 5 pages.

Tarr Kent, L., "Aromatherapy & Isopropyl Alcohol," Livestrong.com, <http://www.livestrong.com/article/110198-aromatherapy-isopropyl-alcohol/> [retrieved Oct. 3, 2012], 4 pages.

"Types of Propellant," BAMA (British Aerosol Manufacturers' Assoc.): Aerosols and Pressure, <http://resources.schoolscience.co.uk/bama/14-16/aerosch5pg2.html> [retrieved Oct. 3, 2012], 2 pages.

* cited by examiner

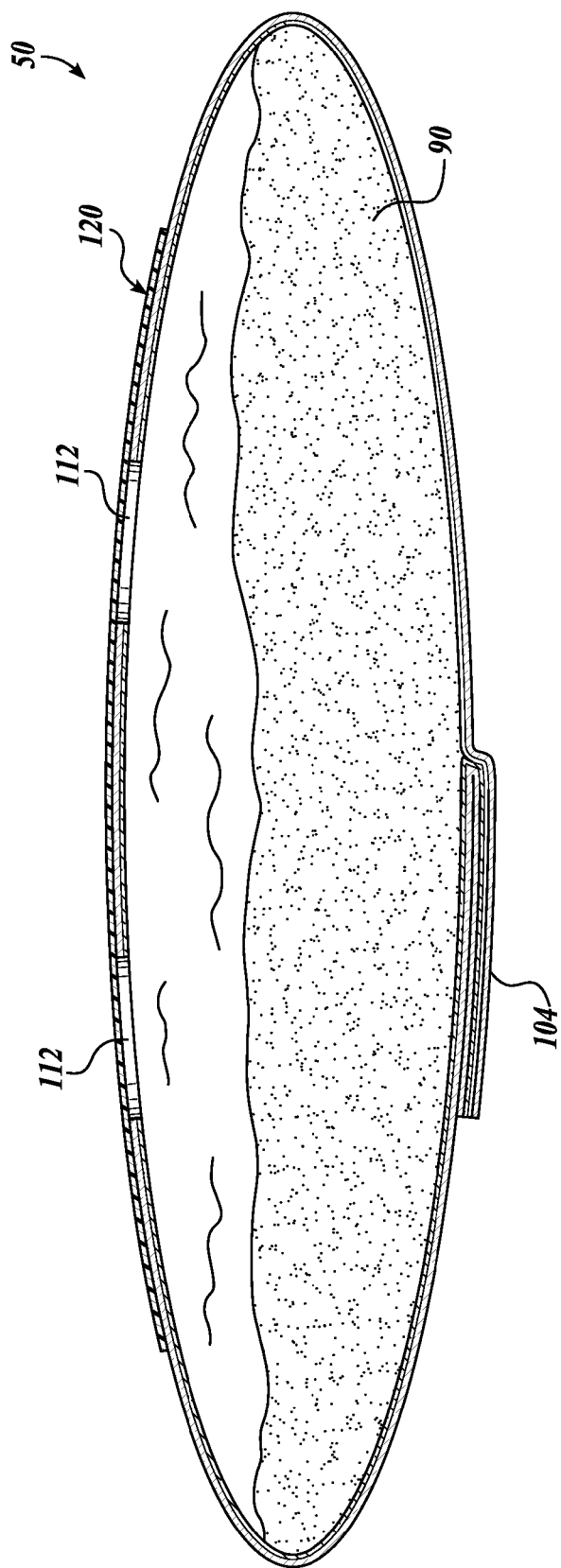

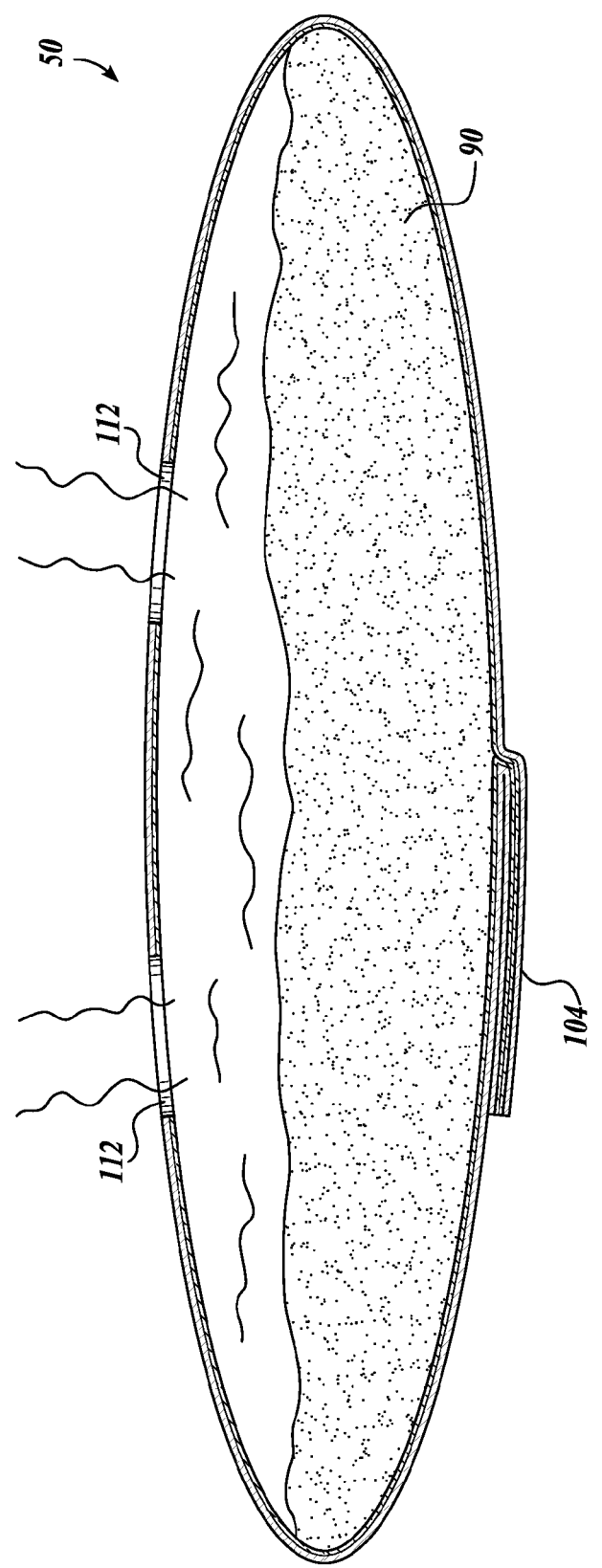

ANT BAIT STATIONS WITH ATTRACTANT VECTOR COMPARTMENT AND EASY OPENING

CROSS-REFERENCE TO RELATED APPLICATION

This application claims the benefit of Provisional Application No. 62/300,752, filed Feb. 26, 2016, the entire disclosure of said application is hereby incorporated by reference.

BACKGROUND

Insect bait stations are known in the art, wherein target insects are encouraged to retrieve a bait that may comprise or contain a component that is harmful to the target insect, for example, an insecticide that does not immediately disable the insect. The target insect transports some amount of the bait (including a delayed-action poison active ingredient) to the nest, which provides more effective eradication. For example, a pest control bait station is disclosed in U.S. Pat. No. 8,156,684, to Kirkland et al., and U.S. Patent Pre-Grant Application Publication No. 2014/0082994, to Mayo, Jr., both of which are hereby incorporated by reference. The bait station disclosed in Kirkland et al. comprises a multi-compartment tray defining separated bait reservoirs, with raised regions providing access, and a conveyance structure from the access apertures into the reservoir. However, the device is relatively complex, and therefore expensive, and it provides only one mode for the target insect to access the bait. Current bait stations on the market for ant control are typically food-based, and include gel baits, liquid baits, and solid granular baits.

As a major part of pest control operations, commercial toxic baits and/or bait stations have been used in both urban and agricultural settings. There are many types of bait stations in both commercial and consumer markets for various pest insects, such as ants, cockroaches, termites, etc. They typically consist of an attractant (e.g., food-based proteins, carbohydrates, or lipids), a carrier, and an active insecticide ingredient. Typically, the bait formulations in containerized devices (stations) are either a thick paste or solid blocks (with no or little water content) in reservoirs. Liquid baits, mainly the sugar-water based baits for several sugar-eating ant species are normally entrapped in closed or liquid-tight sealed containers during the storage and open to the target insects by consumers or pest control personnel by cutting off a small part of container or peeling away the seal. The major drawbacks of liquid baits are that they are typically less effective at attracting many protein/fat eating ant species, and they are susceptible to spillage.

Gel formulations are often preferable to thick paste or solid formulations due to the high water contents (40-80%) in the gel, which accommodates insect feeding preference and controls efficacy. In conventional systems, the gel is packed in syringes or squeeze tubes for direct applications in ant or cockroach infested sites such as cracks, crevices, and voids. Due to the high moister content in gels, current bait station designs are not able to contain or hold gel bait formulations for long periods of time, e.g., during the production, storage, shipping, and display of the product. Therefore, new and inexpensive bait station design concepts suitable for all bait formulations are needed to address above-mentioned issues.

Prior art ant baits have had only limited success. Such baits have not been as effective as they could be because the baits, and bait deployment, have failed to take into account the behavioral characteristics of the target ant, and the impact that biological needs of the ant (and ant colony) will have on these behavioral characteristics.

Ants (>14,000 spp. described; at least 20,000 spp. in nature worldwide) will eat almost anything, including sugars (honeydews, nectars), proteins (live or dead insects) and lipids (soybean or peanut oil). They also require water. Some species, like the leaf-cutter ants (*Atta* and *Acromyrmex*), use leaves to produce fungi in their nests as a food source. Harvester ants (e.g., *Pogonomyrmex*) collect seeds to store food. Some species even use aphids or scale insects, as if they were their cows, for their honeydew secretions. Some species forage by going to various fruits and flowers to collect nectar, for example honey pot ants, whereas other species prefer lipids-rich foods, such as soybean oil or peanut oil, for example imported fire ants.

In general, worker ants (e.g., foragers, nurses, guards) eat sugar-based foods (carbohydrates) in liquid form for energy; ant larvae eat proteins for growth in liquid, semi-liquid or solid forms; whereas queens need to have proteinaceous foods for reproductions and some sugar for energy in liquid or semi-liquid form. Ant larvae can consume solid foods, but adult ants (workers, males and queens) cannot. Worker ants can ingest some solid foods but cannot efficiently digest them. Even though foraging workers could transfer large size of solid protein foods (by mouthparts) or ingest small size of solid particles (by crop), they have a limited ability to digest bulky proteinaceous foods in the mid-gut because of a combination of their narrow waist (petiole) separating the thorax from the abdomen and producing only very small amounts of proteases in their mid-guts. Foraging workers can ingest small solid particles (<0.5 microns), due to the size of the buccal tube that is lined with setae and serve as filters in the ant head. Particles too large to pass through this filtering mechanism remain in the infrabuccal pocket, but can later be transferred by foragers to larvae in the colony.

The larvae, especially the later instars are capable of protein digestion of these large solid protein particles (even in an undigested state) both extra-orally through high protease levels in labial gland secretions and in the mid-gut. The later instars of larvae will feed back some of the digested/liquefied proteins to workers for sharing with young larvae or queens, or the minor nutrient needs for workers. Thus, larvae are not only the passive recipients of nutrition (proteins), but also an active protein digestive organ for the colony. The younger larvae, on the other hand, eat mainly the liquefied, or at least semi-liquefied, proteins provided by workers (directly obtained from field by foragers or fed back from older larvae via workers).

Forager workers handle liquid foods much quicker and more efficiently than solid foods. Liquids, especially sugar-based liquids, are easily ingested through the worker buccal tube into the pharynx and down the esophagus to the crop and mid-gut for storage and digestion. The liquid sugar foods will be transferred to the nest for sharing with other workers, queens and of course for their own energy needs.

Protein provides amino acids that are used predominately by larvae to grow, while carbohydrates are used mostly by workers as a substrate for energy. Larvae play an important role in protein regulation behavior; ant colonies that lack brood prefer carbohydrate-biased diets, while those with brood prefer a more balanced protein-carbohydrate intake. However, too much protein can be toxic for ants. Therefore, regulating protein intake to a fixed level is a mechanism for keeping the entire colony healthy.

Carbohydrates, in contrast to protein, are equally valuable for both workers and larvae. In workers, carbohydrates fuel foraging activities and can be used to build lipid reserves, and in larvae they can enhance development when matched with dietary protein.

The insect fat body is a tissue composed of lobes suspended in the hemocoel, or primary body cavity, and bathed in the insect hemolymph. The fat body plays major roles in the life of insects. It is a dynamic tissue involved in multiple metabolic functions, including the storing and release of energy in response to the energy demands of the insect. Lipid is the main fat body component, and more than 90% of the lipid stored is triglyceride (TAG), which can be synthesized from dietary carbohydrates, fatty acids, or proteins. The key function of fat body is to store and release energy in response to the energy demands of ants. Only a few ant species, such as fire ants, are attracted to and actively forage the lipid-rich food (or baits; such as granules of defatted corn grit impregnated with soybean oil). Most ant species do not actively forage lipids, but they are able to convert sugars (carbohydrates) and/or proteins to lipid.

The decision of a forager to retrieve an encountered food item is influenced by both internal and external factors, occurring at both the individual and colony level. At the individual level, a worker's current physiological condition (e.g., endogenous stores of lipids) may prompt foraging behavior. The attractiveness of an encountered food item may be affected by the perceived relative availability and/or abundance or scarcity of food items. At the colony level, feedback related to larval nutritional demands (especially for protein), transmitted through a 'chain-of-demand' between brood, nurse workers, and foragers, and created through colony member food sharing is likely to be important. However, the strength of both internal and external cues directing worker foraging decisions can vary temporally, compounding the task of nutrient retrieval especially in the face of potential resource shortfalls (e.g., seasonal variation in resource availability). Potential determinants guiding the collection of resources by workers might include, but are not limited to, resource preference of different colony members, temporal shifts in resource availability and worker preference and food distribution among colony members.

Baits work by taking advantage of ant biology and behavior such as social grooming and trophallaxis (food sharing). Once a bait is discovered, foraging ants collect the bait and transport it back to the colony. They will communicate the location and quality of the food sources (baits) to other foragers in the colony via trail pheromone; the other workers will follow pheromone trail(s) to the newly discovered bait. Those workers retrieve the bait and return to the colony, also re-enforcing the pheromone trail laid down by the first group of foragers. In a short period of time many workers will follow the foraging trail, quickly arriving at the bait source, and transfer the bait back to the nest for sharing with other members of the colony.

The brood, especially late instars, may be important in the digestion of solid bait particles into a liquefied form that can be transferred to workers and reproductives in the colony. The amount of brood in the colonies could be responsible for the foraging preference and behavior of the worker ants. Fourth instar larvae do most of the protein digestion in the ant colony and their presence in a colony can change ant foraging preference to proteinaceous materials.

It is through food sharing that toxicant in the bait can be transferred to the rest of the colony. Because the bait is picked up directly by the ant forager workers and is later shared within the colony, relatively low amounts of the toxicant can be used in targeting a pest ant population. Ant foragers that first pick up or consume the bait, share the toxicant within the bait with other workers, queen tenders, and larvae. Typically after 3-4 days the toxicant will reach the queen, which affects reproduction in the colony. Even if the queen dies, eggs may hatch, larvae may pupate and develop into workers. The final control of a large ant colony may take 1-5 months.

A bait station with multiple compartments/chambers with different food bait types (e.g., sugar, protein, or lipid) could meet all the variable nutritional demands of the colony at both the individual and the colony levels throughout the season (regardless of ant species). The presence of all potential nutrients in separated forms in our bait station should increase the likelihood that foraging ants find what they need, and communicate the location and quality of the food sources (baits) to other foragers via pheromones. Such a bait station design would not only significantly increase ant foraging activities and the overall nutrient acquisition efficacy, but more importantly will increase and maximize the transfer and distribution of a lethal dose of insecticide with delayed toxicity to all members of the colony, especially to larvae and queen(s) through the protein bait intake, before foraging and food sharing activities are shut down (due to the toxic active ingredient in the baits) in the colony; and ultimately kill all castes within the nest (workers, larvae, males, and queens) for elimination of the ant colony.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An ant bait station is disclosed that includes a plurality of different ant bait compositions for a target ant species. The plurality of baits are contained in a multi-compartment stick pack having a first sealed end, a second sealed end, a longitudinal seal, and an intermediate seal between the first sealed end and the second sealed end such that the stick pack has at least a first compartment and a second compartment. A plurality of first apertures providing a path into the first compartment and are sized to permit members of the target ant species to enter and exit the first compartment. A first bait disposed in the first compartment is a composition that includes a nutritional attractant and a pesticide. A plurality of second apertures provide a path into the second compartment. A second bait disposed in the second compartment is an attractant to the target ant and an adhesive film disposed over the plurality of first apertures and the plurality of second apertures.

In some embodiments the first bait includes a sugar-based food and a pesticide, and the second bait includes a protein- or lipid-based food. For example, the second bait comprises a protein-based food.

In some embodiments the first compartment containing the sugar-based food and the pesticide is relatively large, and the second compartment containing the protein-based food is relatively smaller.

In some embodiments the first bait comprises a sugar gel bait formulation.

In some embodiments the second bait does not include a pesticide.

In some embodiments the second bait comprises a peanut extract.

In some embodiments the second apertures are smaller than the first apertures such that members of the target ant species cannot pass through the second plurality of apertures.

In some embodiments the second apertures are sized to permit members of the target ant to enter and exit the second compartment.

In some embodiments the first bait comprises a food attractant that is detectable to members of the target ant species only at a relatively short distance, and the second bait comprises an attractant that is detectable by members of the target ant species at a relatively long distance.

In some embodiments the stick pack further comprises a second intermediate seal such that the stick pack further comprises a third compartment and a plurality of third apertures providing a path into the third compartment, and further comprising a third bait disposed in the third compartment, wherein the third bait is different from the first bait and the second bait.

In some embodiments the first bait comprises a sugar-containing gel and a first pesticidal component, the second bait comprises a lipid bait, and the third bait comprises a sugar-containing gel and a second pesticidal component different from the first pesticidal component.

In some embodiments at least one of the first and second pesticidal components comprise borates.

In some embodiments the first compartment is spaced apart from the second compartment.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5A is a sectional view of the bait station shown in FIG. 1, with the adhesive strip attached;

FIG. 5B is a sectional view of the bait station shown in FIG. 1, with the adhesive strip removed;

DETAILED DESCRIPTION

Figure 1:
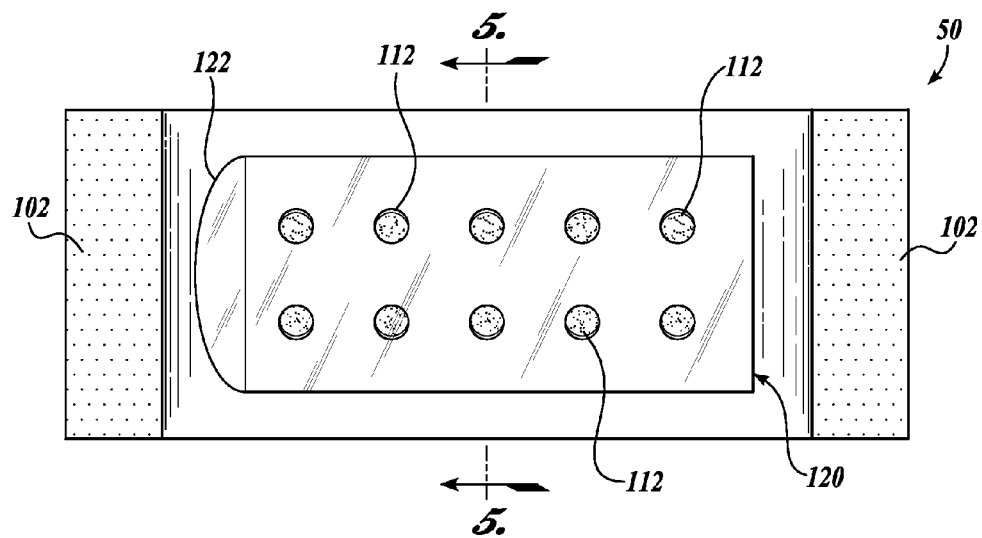
FIG. 1 is a plan view of a first embodiment of a bait station in accordance with the present invention.

Stick packs, typically elongate tubular packaging that are sealed at both ends, have been around for years. Stick packs have more recently become popular in the packaging industry for foods, beverages, and medicines, for example. A key objective in some stick pack technology is to maintain the freshness of the contents of the stick pack (liquids, creams, powders, etc.) until the contents are used. To this end, a packaging film is used comprising at least two layers, with the outer layer(s) typically made from a high density barrier material and one or more inner layers made of lower density material suitable for thermal sealing.

Peel and reclose packages are a relatively new and growing feature in the flexible packaging industry. This packaging concept is designed to provide the customer with an easily opened package, which can be reclosed to preserve product freshness and reduce waste, especially critical for the food packaging industry. This technology uses mechanical die cutting or laser scoring of films in combination with pressure sensitive adhesive (PSA) labels, or scoring of built-in PSA packaging films, e.g., PSA layers integrated into the packaging film structure. The adhesive strip or label is applied over laser-scored (or die cut) material before or after the laser score or die cut forms a pattern smaller than the adhesive label. The adhesive label and laser-scored or die cut packaging material can then be opened and resealed. An exemplary process to manufacture re-closeable packing film using laser scoring and pressure sensitive labels is disclosed in U.S. Patent Pre-Grant Application No. 2013/0320019, to Tinoco et al., which is hereby incorporated by reference in its entirety.

Disclosed herein is a novel and inexpensive method and device to integrate the stick pack technology with the peel-reclose packaging features for holding and delivering insect baits (liquid, gel, paste, and solid) for pest control purpose against various urban insects (such as ants, cockroaches, termites, and yellow jackets), especially for large-scale production of the insect bait stations. In one embodiment this bait station comprises a stick pack formed from a single piece of flexible plastic film with pre-scored or die-cut openings and a removable strip or label providing a releasable seal to retain the insect bait inside the stick pack. The bait station in this embodiment is configured to be produced using a stick pack machine, enabling large-scale, inexpensive production. The releasable seal that covers the holes can be easily removed to activate the bait station, opening the entrances to allow attractant volatiles to escape and to provide insect access to the bait station. Therefore, placing the bait station does not require any tool, knife, or scissors to deploy.

Advantages of bait stations in at least some of the embodiments disclosed herein are economies associated with the use of stick pack packing technology and peel-reclose sticker seal features into an insect bait station device for bait storage, marketing display, and deployment/delivery.

The disclosed bait stations are suitable for use with baits in different forms, including liquids, solids (e.g., substrate, powder, or granular), gels, pastes, and combinations of these forms, including slurries and non-Newtonian fluids.

The design of the bait stations is adaptable to optimize for any particular application, for example, the number, size, shape, and patterns of the openings on the stick pack film may be readily adapted for different formulations or target insect applications.

It is contemplated that a bait station may include micropores in the bait station that deliver liquid formulation as mini-honey dews to the insects without significant leaking, drowning, and/or spillage issues, whereas intermediate size openings may be particularly suited for gel or paste formulation, and large openings may be optimal for solid (block or granular) bait formulations and to provide easy ingress and egress for the target insect.

Figure 2:
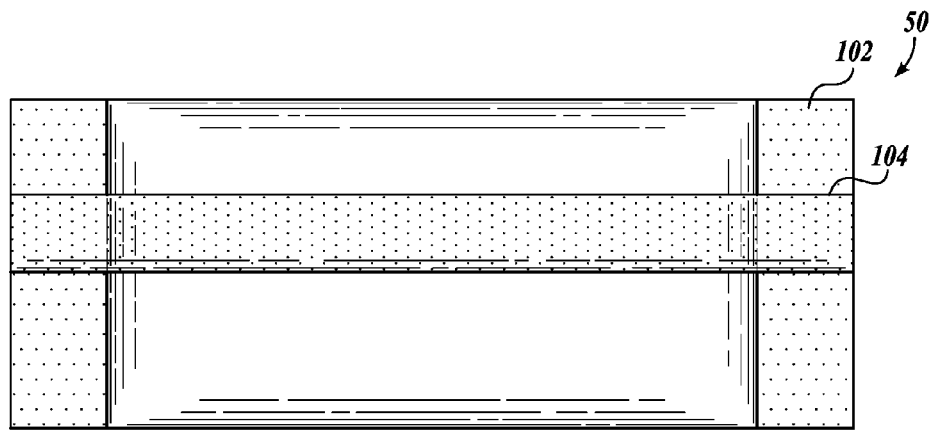
FIG. 2 is a bottom view of the bait station shown in FIG. 1.
Figure 3:
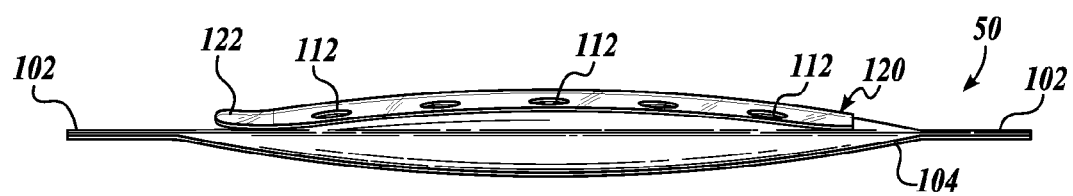
FIG. 3 is a side view of the bait station shown in FIG. 1.
Figure 4:
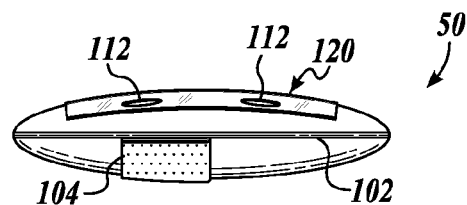
FIG. 4 is an end view of the bait station shown in FIG. 1.

The bait stations disclosed herein are exceptionally convenient and easy to deploy. The user simply removes the adhesive closure (easy-peel label/sticker) and places the bait station in a desired location. Liquid, solid granular, paste, or gel baits may be used. In a current embodiment a gel and/or paste bait is enclosed First Embodiment FIGS. 1-5B illustrate a first embodiment of a bait station 50 in accordance with the present invention. FIG. 1 is a plan view of the bait station 50, FIG. 2 is a bottom view of the bait station 50, FIG. 3 is a side view of the bait station 50, and FIG. 4 is an end view of the bait station 50. FIGS. 5A and 5B show sectional views. Although the FIGURES show a single-compartment bait station for illustrative purposes, it is contemplated that the bait station 50 may be formed with a plurality of compartments. The plural compartments may contain the same bait, or different baits and/or attractants.

In this embodiment the bait station 50 is formed with sealed ends 102 and a longitudinal seam 104 along the bottom side. The portion between the sealed ends 102 defines a fillable volume that receives the bait 90 (see FIGS. 5A and 5B). Although the bait 90 is illustrated as a gel, as discussed above in other embodiments, it may comprise a liquid, paste, solid particulate, or a combination of these forms.

Suitable baits 90 may comprise one or more components that the target ant will identify as nutrition, such that the ant will carry or otherwise transport a portion of the bait 90 to the nest. Exemplary nutrition components include sugars, carbohydrates, proteins, lipids (for example, fatty acids), and the like. The bait 90 will also include one or more components that are pesticidal or otherwise harmful to survival of a target insect nest. For example, a boric acid or other borates may be used. Other pesticidal components include methoprene, pyriproxyfen, fenoxycarb (growth regulators), hydramethylnon, neonicotinoids, avermectin, fipronil, metaflumizone, and indoxacarb. The bait 90 may also include additional semiochemical components that attract the target ants to the bait station 50. Such attractant components may be incorporated into the bait 90, or the bait station may include a separate compartment for housing and deploying the attractant. The bait station 50 itself may also be designed to attract the target ants to the bait station 50, for example, using colors, shapes, or other visual cues that attract the ant.

The bait station 50 includes a set of large holes 112 that are sized to permit the target ant to enter and exit the interior of the bait station 50. It will be appreciated that the bait station 50 has a relatively flat profile, so that the target ants do not require a separate structure or ramp to enter or exit the large holes 112. For example, the large holes 112 may be between one-eighth inch in diameter and one-quarter inch in diameter. The hole may be circular, oval, slots, or polygons. The hole size is selected to be large enough to allow entry therethrough by the target ants, but small enough to minimize or selectively control the rate of loss of moisture or drying of the bait. The large holes may alternatively be shaped as ovals, elongate slots, or polygons. For example, the ovals, elongate slots, or polygons may have a minimum transverse width between one-eighth inch in diameter and one-quarter inch in diameter. In a preferred embodiment, the hole size and number of holes are configured to limit the rate of evaporation of the bait, such that the bait will remain moist for extended periods. Although in the embodiment shown in FIG. 1, there are ten large holes 112, it is contemplated that more or fewer large holes 112 may be selected. For example, embodiments with one, two, or three holes may be used to limit the rate of drying of the bait (if a liquid or moist bait is used), or a greater number of large apertures may be used to provide simultaneous access to a large number of the target ants.

The large holes 112 are sized to admit the target ants into the bait station 50. The plurality of large holes 112 combined with some air space within the bait station creates a synergistic insect feeding effect. A small amount of air space within the bait station has been found to encourage the insect to enter the bait station to feed without hesitation. This same amount of air space allows multiple insects to enter and feed from the same hole. The plurality of holes allows multiple insects to feed simultaneously. The synergistic effect in a bait station of this configuration becomes efficacious much more rapidly since, for example, in the case of ants, the worker ants bring food back to the queen and nest much more rapidly and in greater quantity than would otherwise be the case. In some cases, multiple ants entering the bait station through one or several holes were found to cause a feeding frenzy, with more bait carried by more worker ants in a shorter period of time. The ants will typically carry the bait back to their nest using their mouthparts and stomachs. A secondary mode for transporting bait back to the nest is through adhesion of the bait to the ant body.

Adhesive strips 120 close the holes 112 when the bait station 50 is not in use, for example, before deployment of the bait station 50, e.g., during loading, storage, and in sales displays. In this particular embodiment one adhesive strip 120 is provided covering all of the large holes 112, but more than one adhesive strip may alternatively be used. Depending on the particular application, multiple adhesive strips may be provided, allowing a user to remove fewer than all of the adhesive strips, for example, to slow the rate of evaporation of the bait 90. In another embodiment, a separate adhesive strip and corresponding holes are provided on the opposite side of the bait station, extending the life of the bait station by allowing the user to invert the bait station and remove the adhesive strip when the top surface of the bait had dried.

Preferably, one end 122 of the adhesive strips 120 is not provided with any adhesive, forming a tab to facilitate removal of the adhesive strip 120. It is also contemplated that the adhesive strips 120 may be partially removed, and re-adhered to close the bait station, for example, to permit the bait station to be re-used.

Second Embodiment

Figure 6:
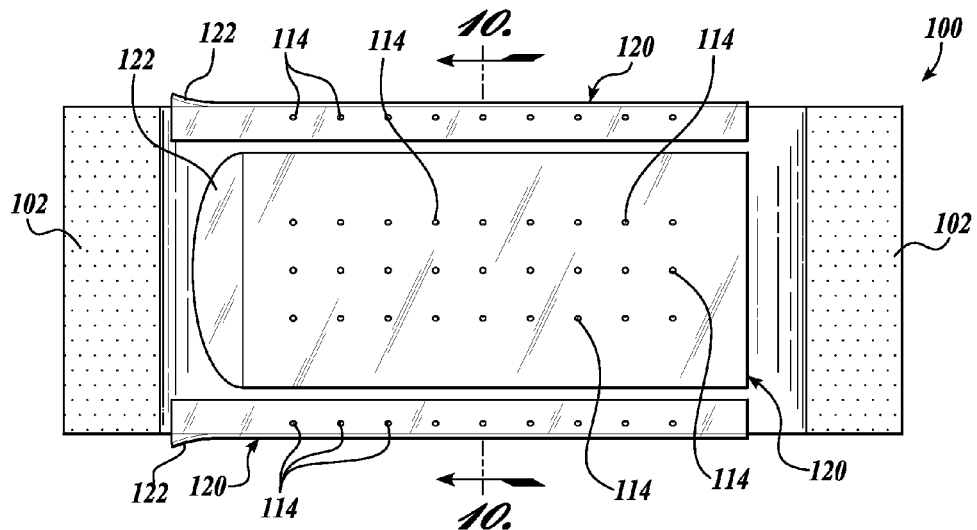
FIG. 6 is a plan view of a second embodiment of a bait station in accordance with the present invention.
Figure 7:
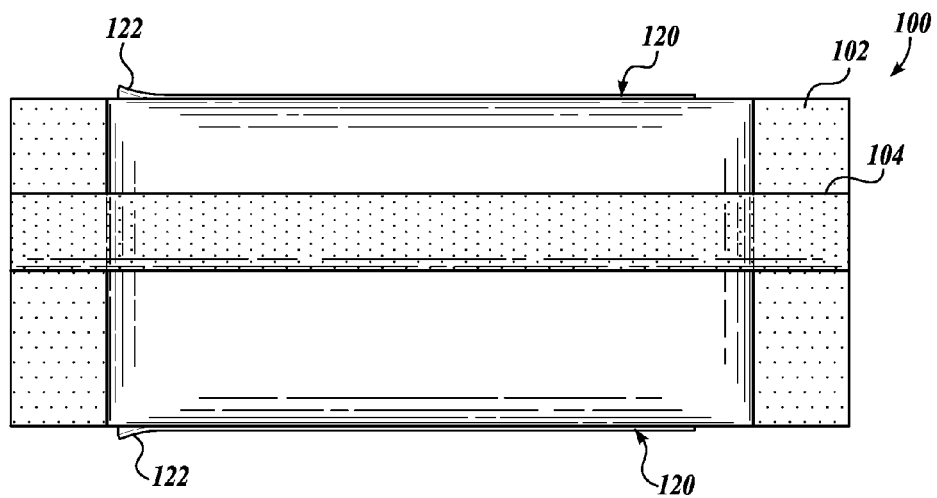
FIG. 7 is a bottom view of the bait station shown in FIG. 6.
Figure 8:
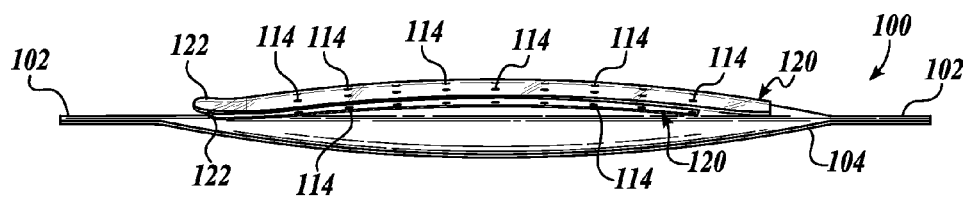
FIG. 8 is a side view of the bait station shown in FIG. 6.
Figure 9:
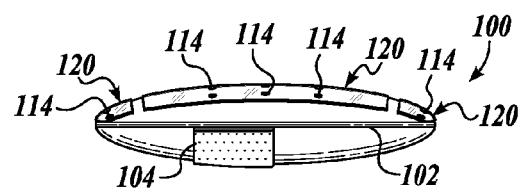
FIG. 9 is an end view of the bait station shown in FIG. 6.
Figure 10A:
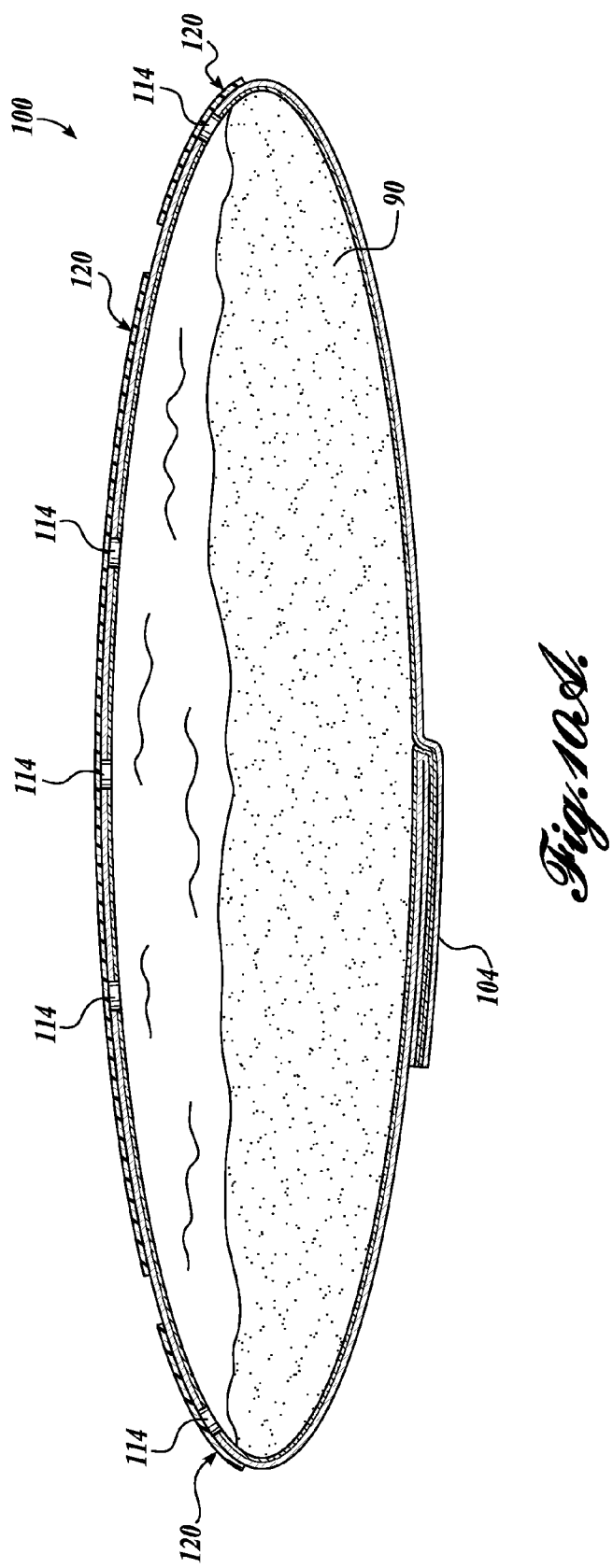
FIG. 10A is a sectional view of the bait station shown in FIG. 6, with the adhesive strip attached.
Figure 10B:
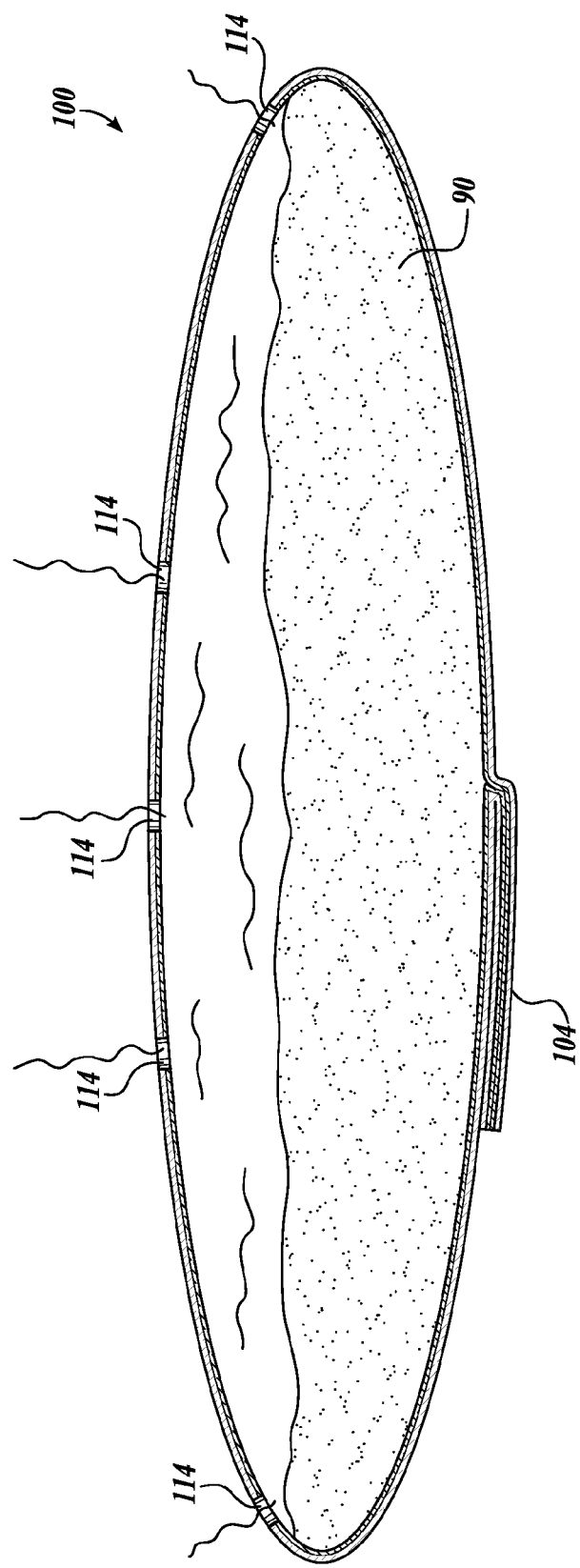
FIG. 10B is a sectional view of the bait station shown in FIG. 6, with the adhesive strip removed.

FIG. 6 is a plan view of a bait station 100 in accordance with the present invention. FIG. 7 is a bottom view of the bait station 100, FIG. 8 is a side view of the bait station 100, and FIG. 9 is an end view of the bait station 100. In this embodiment the bait station 100 is formed as a packet with sealed ends 102 and a longitudinal seam 104 along the bottom side. The center portion between the sealed ends 102 defines a fillable volume (see FIGS. 10A and 10B) that receives the bait 90.

The bait station 100 includes one or more sets of small holes 114 that are not large enough to permit the target ant to enter and exit the interior of the bait station 100, but permits a liquid bait to seep out of the bait station. The bait station 100 is flat enough that the target ants do not require a separate structure or ramp to access the small holes 114 on the top. For example, the small holes may be one-sixteenth of an inch in diameter or smaller. The small holes may have any desired shape. For example, the hole may be circular, oval, slots, or polygons. In a preferred embodiment, the hole size and number of holes are configured to limit the rate of evaporation of the bait, such that the bait will remain moist for extended periods.

Optionally, one or more sets of small holes 114 may be provided on the sides of the bait station 100. For fluid baits the small holes 114 permit small droplets or globules of bait to form on the exterior of the bait station 100. Moreover, agitation of the bait so formed by the target ants may promote additional excretion of the bait 90 from the bait station 100.

The small holes 114 take advantage of a natural tendency of certain ants to suckle, or pull on small particles or portions of a food source. In addition the small quantity of bait 90 extruded or drawn out by seepage or surface tension forces onto the bait station 100 is a suitable size to be collected and transported back to the nest. In the embodiment shown there are three sets of small holes 114. One set of small holes 114 is located on a top surface of the bait station 100, and the other two sets of small holes 114 are disposed on opposite sides of the bait station 100. Therefore, the relatively small bait station 100 provides many access locations for ants to obtain bait 90.

One or more adhesive strips 120 (three shown) close the holes 114 when the bait station 100 is not in use, for example, before deployment of the bait station 100. In this particular embodiment three adhesive strips 120 are provided, one covering the top set of small holes 114. The other two adhesive strips each cover one of the set of small holes 114 on the sides of the bait station 100. Depending on the particular application, a user may elect to remove fewer than all of the adhesive strips 120. Preferably, one end 122 of each of the adhesive strips 120 is not provided with any adhesive, forming a tab to facilitate removal of the adhesive strip 120. It is also contemplated that the adhesive strips 120 may be partially removed and re-adhered to close the bait station, for example, to permit the bait station to be re-used.

Third Embodiment

Figure 11:
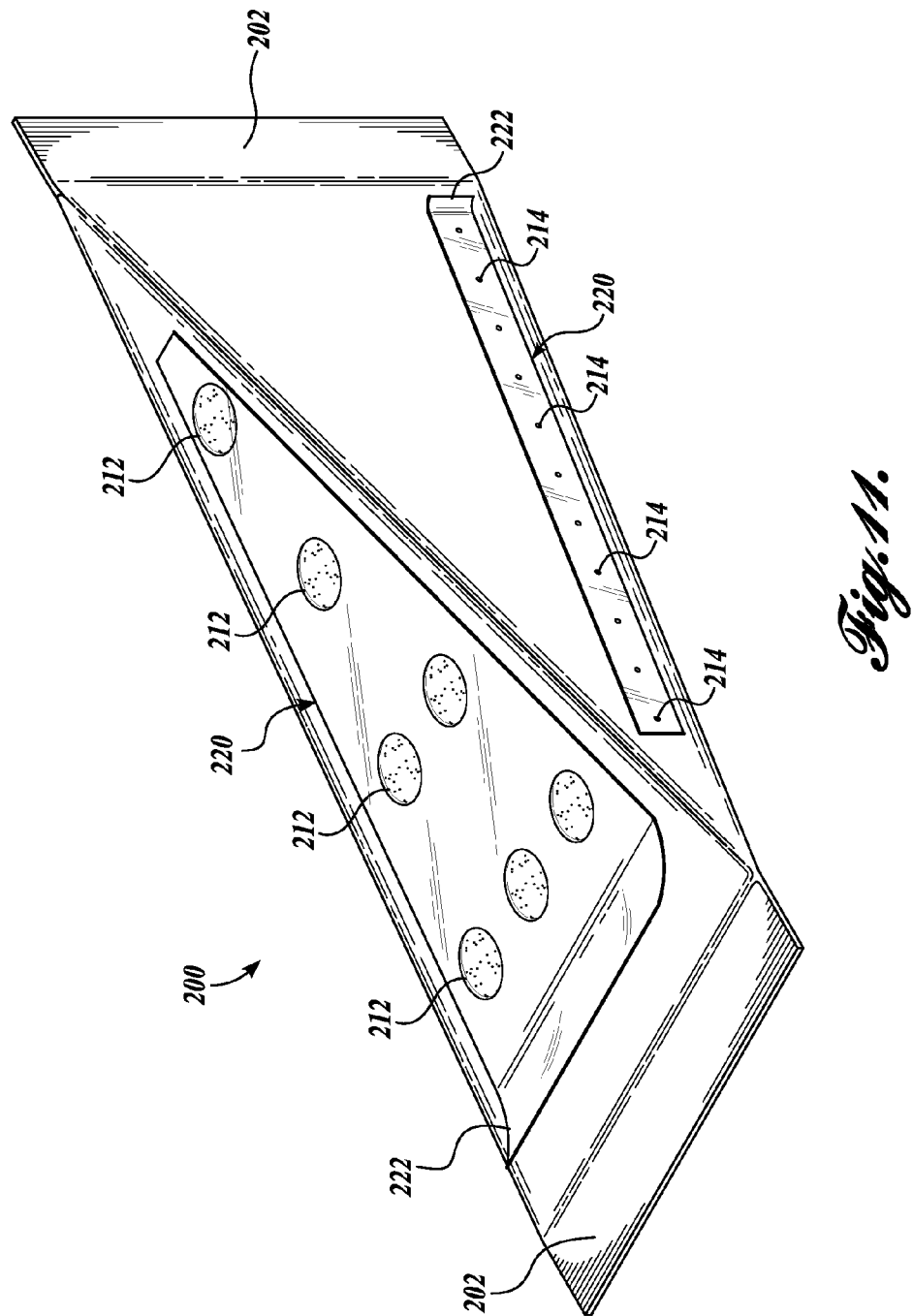
FIG. 11 is a perspective view of another embodiment of a bait station in accordance with the present invention.

FIG. 11 is a perspective view of another embodiment of an ant bait station 200 in accordance with the present invention. The bait station 200 has many features that are described above with reference to FIGS. 1-10, and will not be repeated here for brevity. In this embodiment the bait station 200 has sealed ends 202. However, the sealed ends 202 are oriented about ninety degrees from each other, such that the bait station 200 has a generally tetrahedral shape, with rounded edges. One of the faces (oriented upwardly in FIG. 11) includes a plurality of large holes 212 that are configured to permit the target ant to enter and exit the bait station 200. The large holes 212 are positioned on the upper face, which defines a ramp, which encourages and facilitates the target ants entering the bait station.

The sides (one shown) of the bait station 200 optionally include a plurality of small holes 214 that are positioned to facilitate target ants obtaining extruded portions of bait 90 to return to the nest. Both sets of holes 212, 214 are provided with an adhesive panel 220, which are partially or totally removed by pulling on a non-adhesive tab portion 222 when deploying the bait station 200.

Fourth Embodiment

Figure 12:
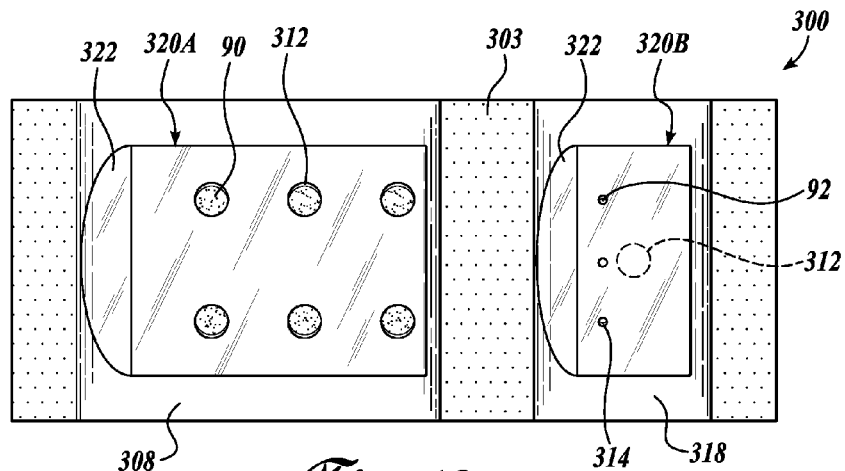
FIG. 12 is a plan view of another embodiment of a bait station in accordance with the present invention, and having more than one compartment.
Figure 13:
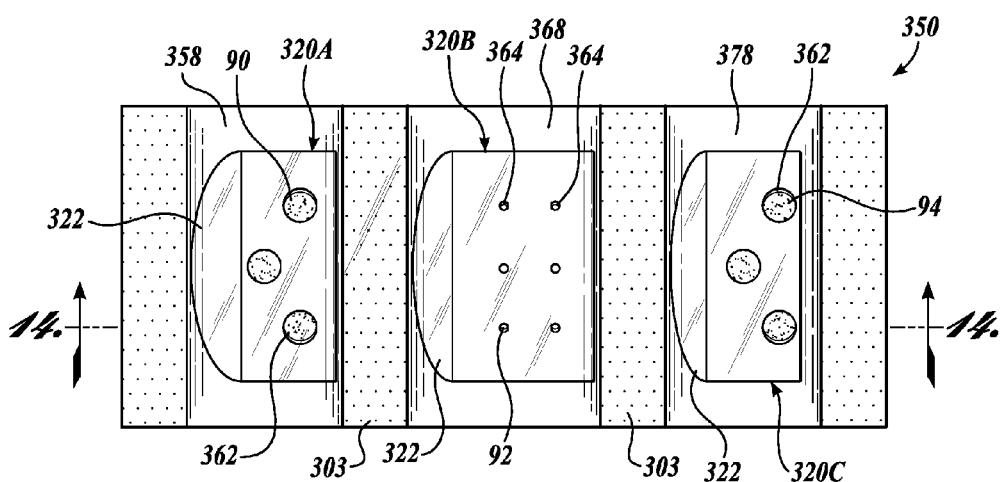
FIG. 13 is a plan view of another multi-compartment embodiment of a bait station in accordance with the present invention.

As discussed above with reference to previous embodiments, the bait station may comprise multiple, separated compartments. In the ant bait station 300 shown in FIG. 12, for example, the ant bait station 300 includes two spaced-apart compartments 308, 318. In some embodiments the bait station comprises multiple stick pack compartments formed from a single piece of flexible plastic film, each stick pack compartment with pre-scored or die-cut openings and an easy-peel adhesive label that releasably seals different formulations of insect baits inside the stick pack.

For example, the two compartments 308, 318 in the stick pack bait station 300 comprise the larger compartment 308, which may contain a sugar gel bait formulation, and the smaller compartment 318 that may contain a protein and/or lipid bait formulation. Bait stations having more than two compartments and containing distinct baits are also contemplated. For example a three-compartment stick pack bait station may include a large compartment for a sugar gel bait formulation, a small compartment for a protein bait, and a second small compartment for lipid bait as a tri-bait station.

Foraging worker ants need to attend to both their own nutritional needs (at the individual level, typically carbohydrates/sugars for energy) and those of their nestmates (at the colony level, carbohydrates for additional workers—e.g., nurse workers—but protein for queens and growing larvae). The sugar-protein intake ratios at the colony level vary strongly by ant species, colony development status, and season. The availability, abundance, and quality of different types of food items has a significant impact on the foraging behavior/performance and the colony development.

A bait station with multiple separated compartments with different food bait types (sugar, protein, or lipid) in each compartment (e.g., without mixing food types) could effectively meet all of these variable nutritional demands at both the individual level and the colony level, and throughout the seasons (regardless of ant species). Such a bait station design significantly increases ant foraging activities and the overall nutrient acquisition efficacy; and even more importantly increase and maximize the transfer and distribution of a lethal dose of insecticide with delayed toxicity to all members of the colony, especially to larvae and queen(s) through the protein bait intake. This improves the ability to attain a suitable dose to the colony before foraging and food sharing activities are shut down due to toxic active ingredient in the baits; and ultimately kill all castes within the nest (workers, larvae, males, and queens) for quick elimination of the ant colony.

On the other hand, a bait station with a single compartment containing a single food type bait, or a mixture of multiple types of foods has much less, and slower, knockdown and pesticidal efficacies on the ant colony than does the multiple-chamber bait station disclosed herein.

A single food type bait (sugar, protein, or lipid) regardless of formulation (liquid, gel, paste, or solid) lacks nutritional needs of ant colonies for the other food types. Therefore the ants will have less foraging and food sharing activities of the baited food, restricting the pesticidal effect only to the members of castes that feed on that food type in the bait station. The single food type bait will have no or little effects on castes that do not feed on the bait food type. For a mixture food type bait (two or more of sugar, protein, and lipid) combined or mixed in a single compartment, foraging workers are forced to take/collect the mixture of multiple types of foods if the mixture is provided in the single chamber bait station, even though the ant may only be foraging for one food type (e.g., sugar or protein, but not both) for the colony at that particular time; the unfavorable food nutrient ratios in the bait would certainly reduce the foraging and food sharing efficacy, since the workers will have to spend significant time and energy to extract needed sugar for workers' energy needs or to separate the needed protein for larvae and/or queens from the mixed food bait. This food/nutrient extraction or separation process by foraging workers will significantly slow down the transfer and distribution/re-distribution of a lethal dose of insecticidal bait to all caste members of the nest, and reduce the killing efficacy of the target ant colony.

In addition to the above-mentioned nutritional factors, there is a strong synergistic effect on the attraction of target ant species to different food-based formulations. For example, volatiles released from lipid formulation (such as peanut butter or soybean oil-based granules) or from protein bait will have a long range of attraction not only to the protein or lipid eating ant species, but also to the sweet-eating ant species, since in nature the sweet/sugar sources often co-exist with either a protein or lipid source, or both. On the other hand, the moisture from the sugar gel or liquid baits may also attract the protein and/or lipid eating species. It will also be appreciated that a particular ant species may have a feeding preference that changes depending on the time of year or day, and of course the different development stages of the colony.

Multiple bait types in a single bait station will also provide additional efficacy to the consumer if the particular target ant species, or its feeding preferences, is not known to the consumer. Thus, a multiple-compartment bait station with bait formulations separated by bait type may be configured to be effective on all common pest ant species (regardless of the colony development stages), during any time of the year or day, and therefore perform better than bait station with a single compartment containing one food type or a mixture of food types, as discussed above.

It may also be advantageous to provide an attractant, such as a natural/synthetic food attractant or an ant pheromone that does not contain a pesticidal component, alongside an attractive food source that does include the pesticidal component. For example, a lipid or protein food attractant that is effective at attracting the target ant from a longer distance may not be suitable for mixing with a desired pesticide, because the pesticide may not be easily dissolved with solid formulations. The non-pesticidal bait attractant may be provided in a compartment having apertures that are too small to permit the target ant from entering or extracting the bait. For example, a lipid or protein attractant may be provided in one compartment of a stick pack bait station, and a sugar-based near-distance food bait attractant containing the desired pesticidal component may be provided in a separate accessible compartment in the bait station. Target ants attracted by volatiles from the protein or lipid attractant food may be drawn to the bait station, and on arrival engage the sugar-based pesticidal bait.

As briefly discussed above, FIG. 12 illustrates a stick-pack type bait station 300 having a first compartment 308 and a second compartment 318. The first and second compartments 308, 318 are separated by sealed regions 303. The first compartment 308 contains a first food bait 90 with a pesticidal component, for example, a sugar-containing gel. A plurality of apertures 312 provide access to the first compartment and are sized to allow the target ant to enter and exit the first compartment 308. The second compartment 318 contains a second food bait 92, and may or may not include a pesticidal component. For example, the second food bait may include a lipid, such as peanut butter, or a protein. If the second food bait includes a pesticidal component, it may be preferable to provide one or a plurality of large apertures 312 to permit the target ants to enter and exit the second compartment 318. If the second food bait comprises an attractant without a pesticidal component (therefore, acting as an attractant only), a plurality of small apertures 314 provide openings for the release of attractant volatiles, but do not allow the ants to enter the second compartment 318. Removable adhesive strips 320A, 320B, each having a non-adhesive portion providing a tab 322 at one end, are provided over respective compartments 308, 318 to close apertures 312, 314 and seal the food bait/attractant contents. The bait station 300 is activated by simply removing the adhesive strips 320A, 320B and then the bait station 300 is placed in a desired location.

Fifth Embodiment

Figure 14:
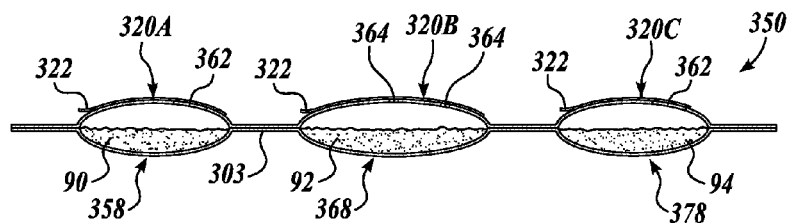
FIG. 14 is a side view in cross section of the bait station shown in FIG. 13.

Another bait station 350 in accordance with the present invention, and having three compartments 358, 368, 378, is shown in FIGS. 14 and 15.

Each compartment 358, 368, 378 has a respective adhesive removable strip 320A, 320B, 320C for sealing the bait/attractant formulations and for easy opening (bait activation). A tab 322 is formed as an adhesive-free end of the removable strip 320A, 320B, 320C to facilitate removal of the adhesive strip. The three compartments 358, 368, 378 are separated by sealed regions 303. The ends 302 are also sealed. The first compartment 358 contains a first bait 90 comprising a food bait, such as a sugar gel, and a first pesticidal component. A plurality of apertures 362 provide the target ant with access to the first bait 90.

The second compartment 368 contains a second bait 92. For example, the second bait 92 may contain protein or lipid having a volatile that can be detected by the target ant species from a relatively large distance as an attractant. The second compartment also has a plurality of apertures 364. The apertures 364 may be smaller (as shown), particularly if the second bait 92 does not include a pesticide, to limit the ability of the target ant to carry the second bait 92 away from the compartment 368. If the second compartment 368 includes a pesticidal component the apertures 364 may be larger. The second compartment 368 may also contain natural or synthetic ant attractants (e.g., food flavors or ant pheromones, or both) for long-range attraction of the target ant species.

The third compartment 378 contains a third bait 94. The third bait 94 may include an attractant food and a pesticidal component. The third bait 94 pesticidal component may be different from the first bait 90 pesticidal component, and different from the second bait 92 pesticidal component (if any). The third bait 94 is selected to improve the efficacy of the bait station, for example, providing alternative pesticidal means for destroying the ant nest, providing synergistic pesticidal means, or even more importantly reducing the ant resistance development to the insecticide. Apertures 362 in the third compartment 378 are sized to provide means for the target ant to access the third bait 378. The attractant food in the third bait 94 in the third compartment 378 may be the same (e.g., with a different pesticidal component) or different (e.g., with a different pesticidal component) from that used in the first and/or second baits 90, 92.

In any of the disclosed embodiments the bait stations may be contoured, shaped, colored, and/or decorated to visually attract target ants towards the bait station. In an embodiment the bait station may include a surface coating over at least a portion of the bait station that emits an olfactory semiochemical to attract ants to the bait station. For example, the adhesive may incorporate and release a scent or chemical attractant that is derived from or mimics a composition that the target ant perceives as food.

While illustrative embodiments have been illustrated and described, it will be appreciated that various changes can be made therein without departing from the spirit and scope of the invention.

The embodiments of the invention in which an exclusive property or privilege is claimed are defined as follows:

1. An ant bait station including a plurality of different ant bait compositions for a target ant species comprising:
   a stick pack having a first sealed end, a second sealed end, a longitudinal seal, and an intermediate seal between the first sealed end and the second sealed end such that the stick pack has a first compartment and a second compartment;
   a plurality of first apertures providing a path into the first compartment, wherein the plurality of first apertures are sized to permit members of the target ant species to enter and exit the first compartment;
   a first bait disposed in the first compartment and comprising a composition that includes a nutritional attractant and a pesticide;
   a plurality of second apertures providing a path into the second compartment;
   a second bait disposed in the second compartment that is an attractant to the target ant; and
   an adhesive film disposed over the plurality of first apertures and the plurality of second apertures.

2. The ant bait station of claim 1, wherein the first bait comprises a sugar-based food and a pesticide.

3. The ant bait station of claim 2, wherein the second bait comprises a protein- or lipid-based food.

4. The ant bait station of claim 2, wherein the second bait comprises a protein-based food.

5. The ant bait station of claim 4, wherein the first compartment containing the sugar-based food and the pesticide is relatively large, and the second compartment containing the protein-based food is relatively smaller.

6. The ant bait station of claim 5, wherein the first bait comprises a sugar gel bait formulation.

7. The ant bait station of claim 3, wherein the second bait does not include a pesticide.

8. The ant bait station of claim 2, wherein the second bait comprises a peanut extract.

9. The ant bait station of claim 1, wherein the second apertures are smaller than the first apertures such that members of the target ant species cannot pass through the second plurality of apertures.

10. The ant bait station of claim 1, wherein the second apertures are sized to permit members of the target ant to enter and exit the second compartment.

11. The ant bait station of claim 1, wherein the first bait comprises a food attractant that is detectable to members of the target ant species only at a relatively short distance, and the second bait comprises an attractant that is detectable by members of the target ant species at a relatively long distance.

12. The ant bait station of claim 1, wherein the stick pack further comprises a second intermediate seal such that the stick pack further comprises a third compartment and a plurality of third apertures providing a path into the third compartment, and further comprising a third bait disposed in the third compartment, wherein the third bait is different from the first bait and the second bait.

13. The ant bait station of claim 12, wherein the first bait comprises a sugar-containing gel and a first pesticidal component, the second bait comprises a lipid bait, and the third bait comprises a sugar-containing gel and a second pesticidal component different from the first pesticidal component.

14. The ant bait station of claim 13, wherein at least one of the first and second pesticidal components comprises borates.

15. The ant bait station of claim 1, wherein the first compartment is spaced apart from the second compartment.

* * * * *